(12) United States Patent
Odgers (10) Patent No.: US 7,258,352 B2
(45) Date of Patent: Aug. 21, 2007

(54) SHOPPING CART HAVING SLOTTED RACK FOR SECURING OBJECTS

(76) Inventor: Stacey Anne Odgers, 135 Bodine Rd., Berwyn, PA (US) 19312

( * ) Notice: Subject to any disclaimer, the term of this patent is extended or adjusted under 35 U.S.C. 154(b) by 328 days.

(21) Appl. No.: 11/027,259

(22) Filed: Dec. 30, 2004

(65) Prior Publication Data

US 2006/0145437 A1    Jul. 6, 2006

(51) Int. Cl.
*B62B 1/00*    (2006.01)
(52) U.S. Cl. .................. 280/47.28; 280/47.2; 280/654; 280/659
(58) Field of Classification Search ............ 280/47.17, 280/47.19, 47.2, 47.24, 47.28, 47.35, 654, 280/655, 659
See application file for complete search history.

(56) References Cited

U.S. PATENT DOCUMENTS

| | | |
|---|---|---|
| 2,249,123 A | 7/1941 | Fleck et al. |
| 2,514,849 A | 7/1950 | Dewing |
| 2,757,935 A | 8/1956 | Sofia |
| 2,890,060 A | 6/1959 | Ott et al. |
| 3,861,633 A | 1/1975 | Rappleye et al. |
| 3,909,034 A | 9/1975 | Trubiano |
| 3,992,038 A | 11/1976 | Guadano, Sr. |
| 4,369,987 A | 1/1983 | Witherell |
| 4,407,521 A | 10/1983 | Zeitlin |
| 4,521,030 A * | 6/1985 | Vance .......................... 280/42 |
| 4,549,748 A | 10/1985 | Haley, Sr. |
| 4,560,096 A | 12/1985 | Lucas et al. |
| 4,576,388 A | 3/1986 | Pope |
| 4,678,195 A | 7/1987 | Trubiano |
| 4,703,944 A * | 11/1987 | Higson ......................... 280/30 |
| 4,733,877 A | 3/1988 | Pastien |
| 4,830,385 A | 5/1989 | Wallick et al. |
| 4,865,346 A * | 9/1989 | Carlile ......................... 280/654 |
| 4,974,799 A | 12/1990 | Palmer |
| 5,026,089 A | 6/1991 | Grimmonpre |
| 5,203,578 A | 4/1993 | Davidson et al. |
| 5,242,189 A | 9/1993 | Osaki |
| 5,251,925 A | 10/1993 | Haley, Sr. |
| 5,464,104 A | 11/1995 | McArthur |
| 5,464,183 A | 11/1995 | McConnell et al. |
| 5,558,359 A | 9/1996 | Phears |
| 5,595,394 A | 1/1997 | Adamson |
| 5,626,352 A | 5/1997 | Grace |
| 5,678,842 A | 10/1997 | Hook et al. |
| 5,697,624 A | 12/1997 | Faraj |
| 5,863,055 A | 1/1999 | Kasravi et al. |

(Continued)

*Primary Examiner*—Christopher P. Ellis
*Assistant Examiner*—Katy Meyer
(74) *Attorney, Agent, or Firm*—Duane Morris LLP; Steven E. Koffs (57) ABSTRACT

A cart includes a base having a plurality of wheels. A first frame portion is pivotally attached to the base. A second frame portion is pivotally attached to the first frame portion. The second frame portion has a frame handle. A rack is pivotally attached to the first frame portion. The rack has a plurality of slots, indentations, or cut-outs arranged in pairs on opposite sides of the rack. Each pair of slots, indentations or cut-outs is capable of receiving a respective handle of a respective bag, box or parcel hanging from the rack. A retaining member is attachable to the rack so as to overlie each respective handle of a bag, box or parcel, securing the bag, box or parcel when the retaining member is attached to the rack.

18 Claims, 8 Drawing Sheets

U.S. PATENT DOCUMENTS

| | | |
|---|---|---|
| 6,003,894 A | 12/1999 | Maher |
| 6,092,704 A | 7/2000 | Baumeister |
| 6,102,433 A | 8/2000 | Stevens |
| 6,264,230 B1 * | 7/2001 | Huggins .................... 280/651 |
| 6,328,329 B1 | 12/2001 | Smith |
| 6,502,731 B1 | 1/2003 | Gehring et al. |
| 6,523,840 B1 | 2/2003 | Koppes et al. |
| 6,619,546 B1 | 9/2003 | Nguyen et al. |
| 6,669,212 B2 | 12/2003 | Porter |
| 6,679,506 B2 | 1/2004 | Koppes et al. |
| 6,918,474 B2 * | 7/2005 | Nykoluk .................... 190/115 |
| 2002/0089134 A1 | 7/2002 | Salzberger et al. |
| 2004/0135390 A1 | 7/2004 | Gammon |

* cited by examiner

SHOPPING CART HAVING SLOTTED RACK FOR SECURING OBJECTS

FIELD OF THE INVENTION

The present invention relates to the field of shopping carts.

BACKGROUND

A variety of personal shopping carts have been developed.

U.S. Pat. No. 4,830,385 to Wallick et al. describes a cart for supporting and transporting a plurality of handled shopping or grocery bags. The cart includes an elongated base having a pair of spaced apart wheels at one end and a stabilizing bar at its opposite end. A vertical stanchion carries a support bar at a location midway between its opposite ends on which a plurality of posts or pins are carried, and about which the handles of shipping or grocery bags are held while suspended from the support bar. An adjustable handle is disposed on the end of the support bar over the wheels for tilting the cart on the wheels to pull or push the cart along a traveling surface. This cart can be dismantled, but is not readily collapsible for quick storage in an automotive vehicle.

U.S. Pat. No. 5,678,842 to Hook et al. describes a collapsible cart for transporting a plurality of handled shopping bags and the like. The cart has an elongated frame having upper and lower sections which are pivotally coupled together. The frame is adjustable between a deployed position where the upper and lower frame sections are substantially aligned longitudinally and a collapsed position where the upper and lower frame sections are folded together. A pair of wheels are pivotally coupled to the lower section of the frame which fold together when the frame is collapsed. A support arm for suspending a load is pivotally coupled to the frame upper section and is moveable between a horizontal, load-supporting position and a folded position extending alongside the frame. The shopping bags are suspended from a plurality of hooks mounted on the support arm. The bags suspended from this cart are not secured, and can be easily stolen.

An improved shopping cart is desired.

SUMMARY OF THE INVENTION

A cart comprises a base having a plurality of wheels. A first frame portion is pivotally attached to the base. A second frame portion is pivotally attached to the first frame portion; the second frame portion having a frame handle. A rack is pivotally attached to the first frame portion. The rack has a plurality of slots, indentations, or cut-outs arranged in pairs on opposite sides of the rack. Each pair of slots, indentations or cut-outs is capable of receiving a respective handle of a respective bag, box or parcel hanging from the rack. A retaining member is attachable to the rack so as to overlie each respective handle of a bag, box or parcel, securing the bag, box or parcel when the retaining member is attached to the rack.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

FIGS. 1-7 show an exemplary personal shopping cart 100, which is suitable for use in carrying paper or plastic handled bags in shopping malls or on streets, and may be used to unload bags from a car to bring the bags into a home, or for moving beach and fishing equipment, or the like. The cart is collapsible for easy transport, and has a low weight of about ten pounds (4.5 kilograms) or less.

A first frame portion 114 is pivotally attached to a base 110. A second frame portion 116 is pivotally attached to the first frame portion 114. The second frame portion 116 has a frame handle 118.

A rack 120 is pivotally attached to the first frame portion 114. The rack 120 is preferably in the form of a bag support conveniently sized to carry standard and oversized rope-handled department store bags, standard plastic grocery bags or any other type of container having a flexible handle or flat handle. The rack 120 has a plurality of slots, indentations, or cut-outs 122 arranged in pairs on opposite sides of the rack. Each pair of slots, indentations or cut-outs 122 is capable of receiving a respective handle of a respective bag, box or parcel 128 hanging from the rack 120, with vertical portions of the handle passing through the pair of slots 122 and a horizontal portion of the handle lying across the rack 120 in a direction that is generally perpendicular to the length of the rack. The slots, indentations, or cut-outs 122 prevent the bags or parcels from sliding forward and backward when the cart is tilted or moved. The exact shape of the slots, indentations, or cut-outs 122 is not critical to the operation of the cart 100. For example, the slots, indentations, or cut-outs may be semicircular, semi-elliptical, approximately rectangular, approximately triangular, or other shape.

Figure 1:
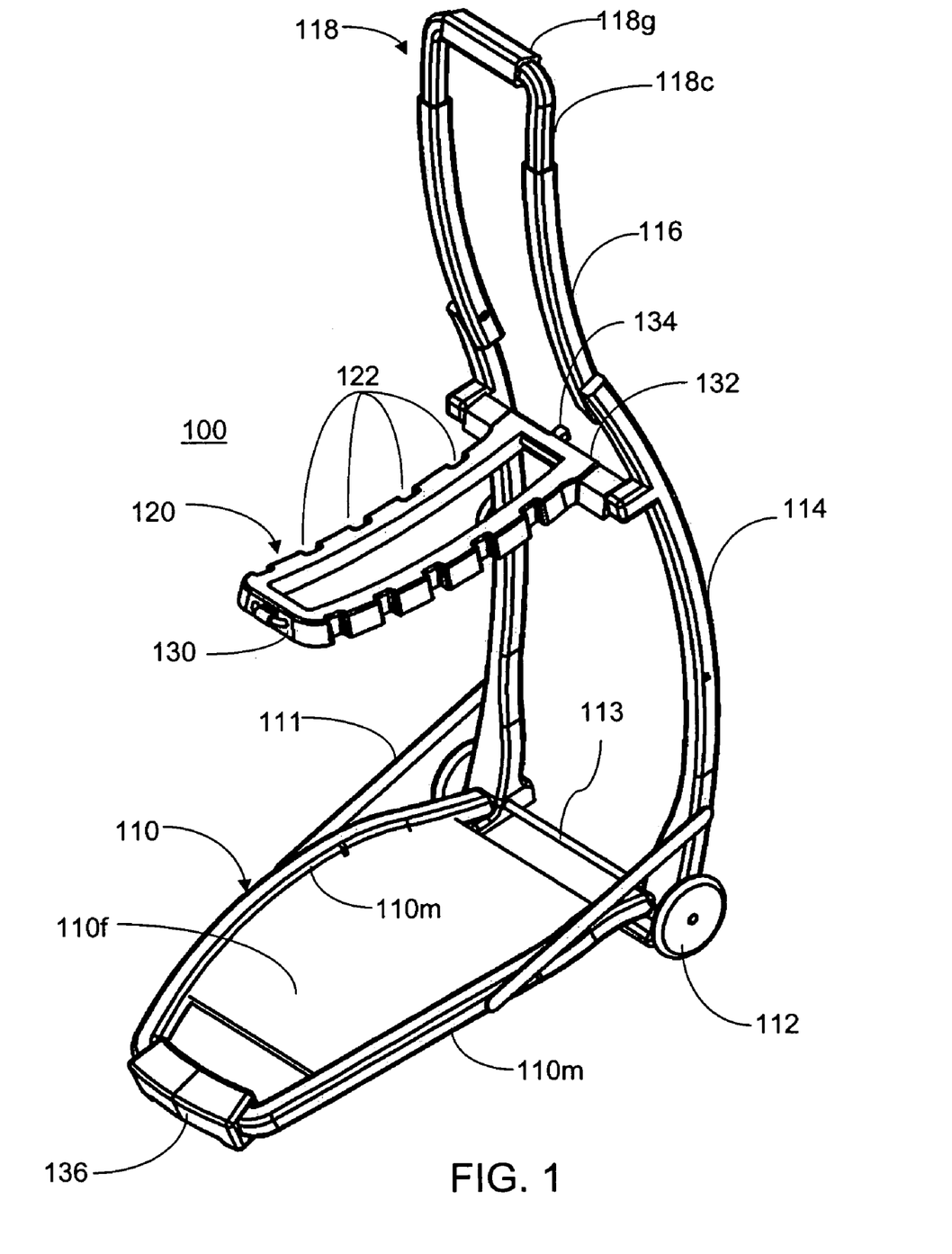
FIG. 1 is a front isometric view of an exemplary cart according to one embodiment of the present invention.
Figure 2:
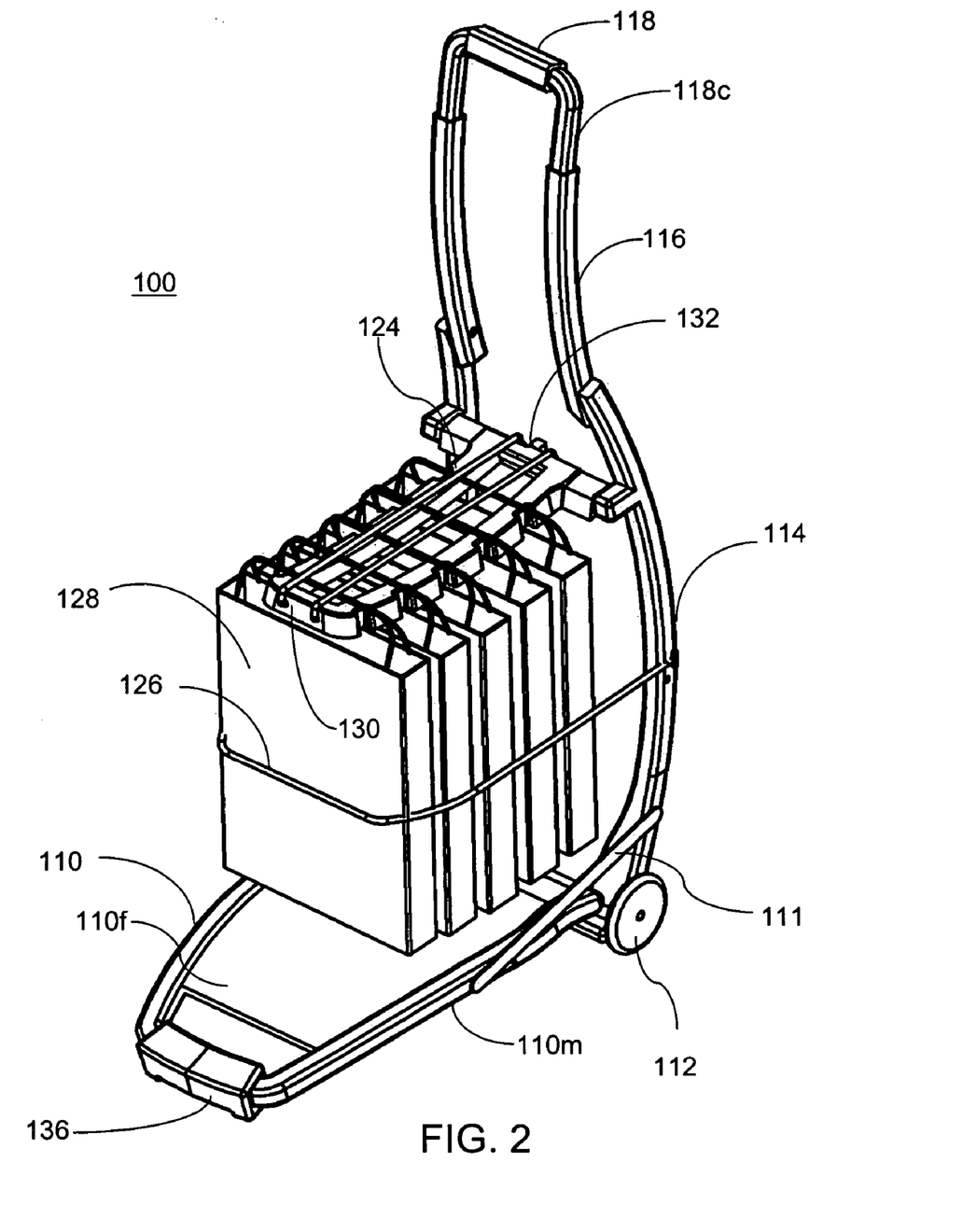
FIG. 2 shows the cart of FIG. 1, holding a plurality of parcels.
Figure 3:
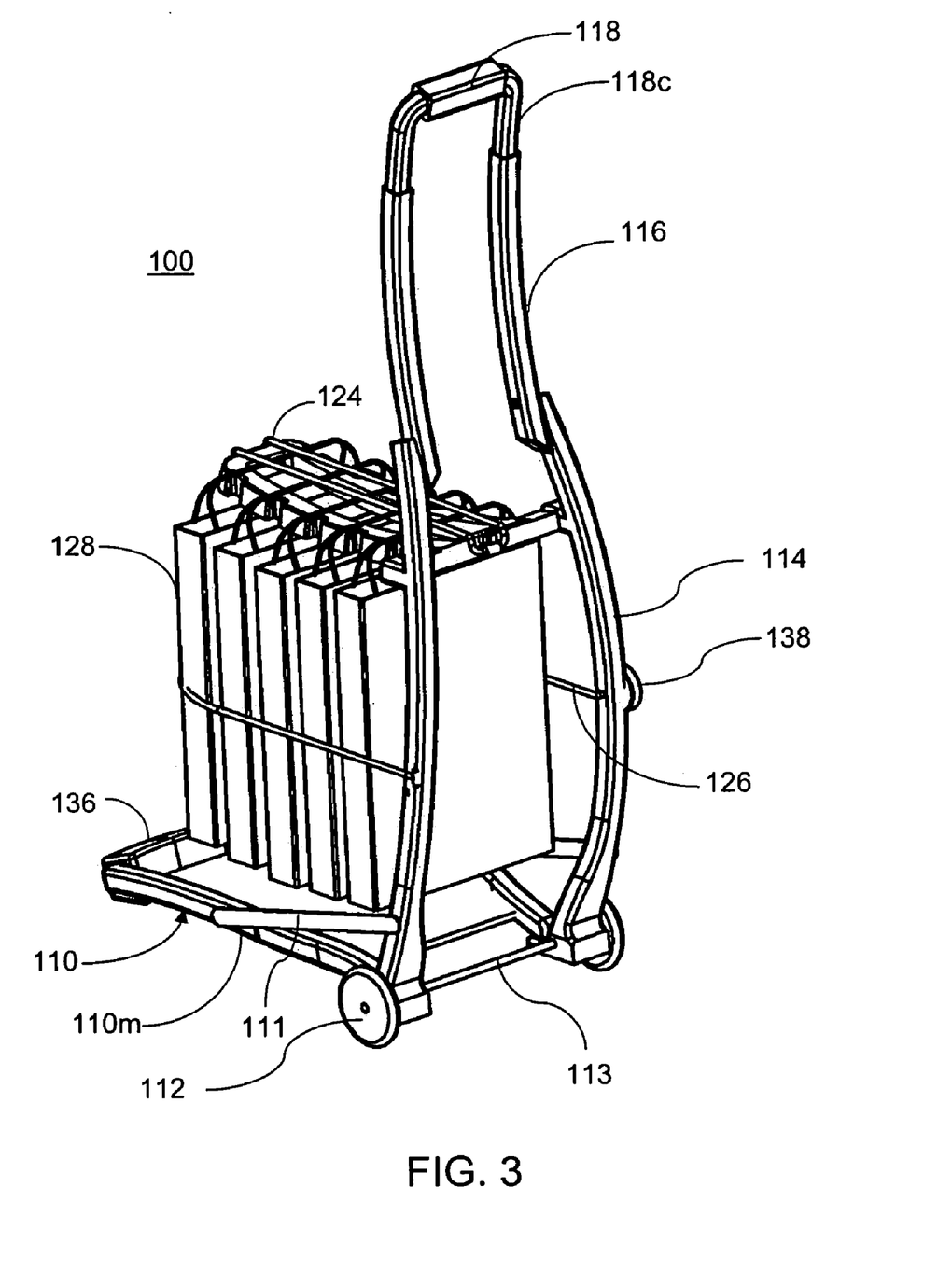
FIG. 3 is a rear isometric view of the cart of FIG. 1.
Figure 4:
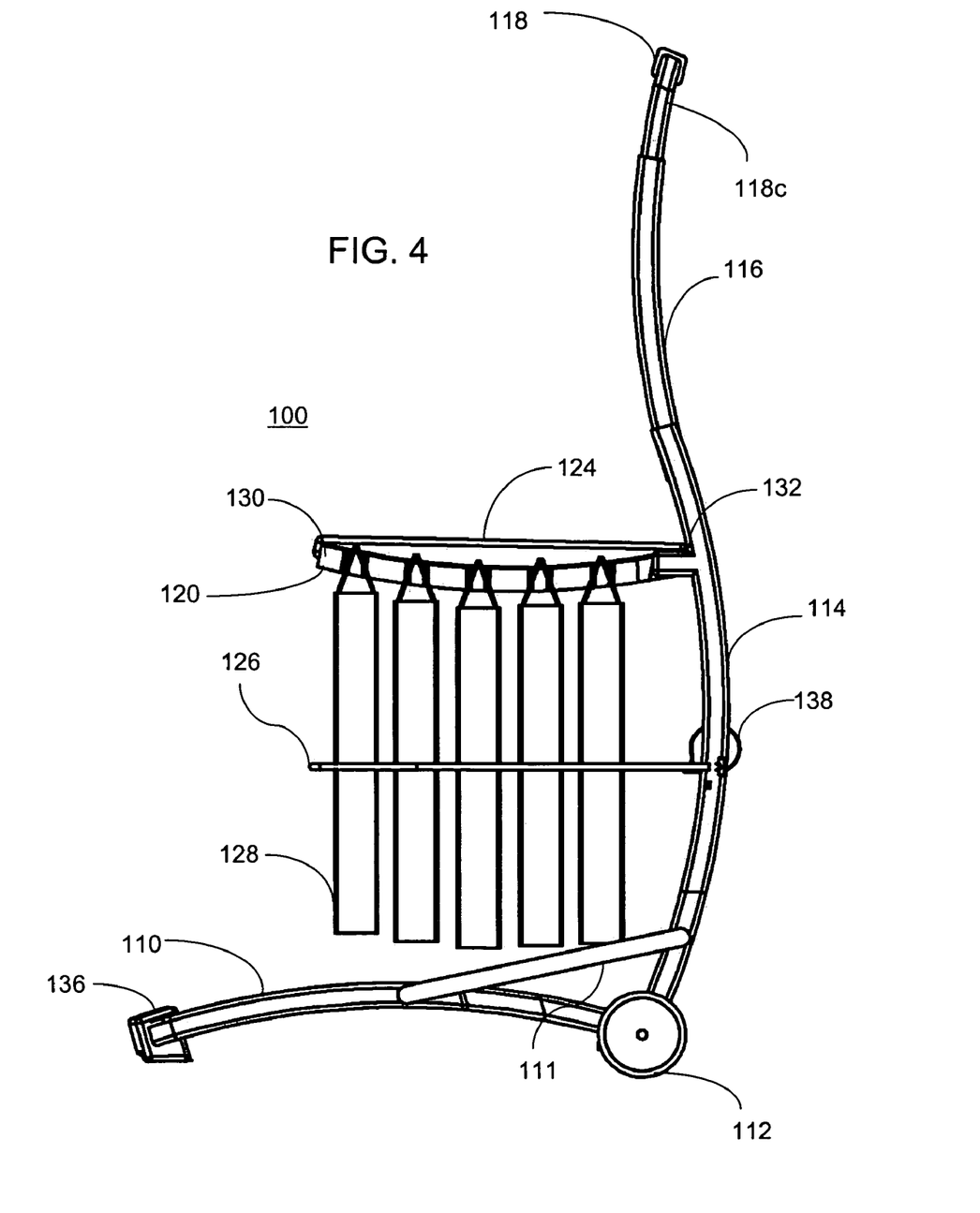
FIG. 4 is a left side elevation view of the cart of FIG. 1.

In some embodiments, the bag support 120 is optionally curved, as best seen in FIG. 4. In embodiments where the frame portions 114 and 116 are curved, the curvature of the bag support 120 assists in allowing the entire assembly 100 to be collapsed and folded compactly, for storage, or for transport in an automotive vehicle.

A retaining member 124 is attachable to the rack 120 so as to overlie each respective handle of a bag, box or parcel 128, securing the bag, box or parcel when the retaining member is attached to the rack.

In some embodiments, the retaining member 124 is attached at opposite ends 130 and 132 of the rack 120. In some embodiments, the retaining means or member 124 is a stretch cord located at the tip of the curved bag support 120. The rack 120 may have a projection 134 on an end 132 thereof, and the retaining member 124 may include a U-shaped elastic band having two ends attached to an end 130 of the rack. The elastic band 124 is wrapped around the projection 134.

Figure 5:
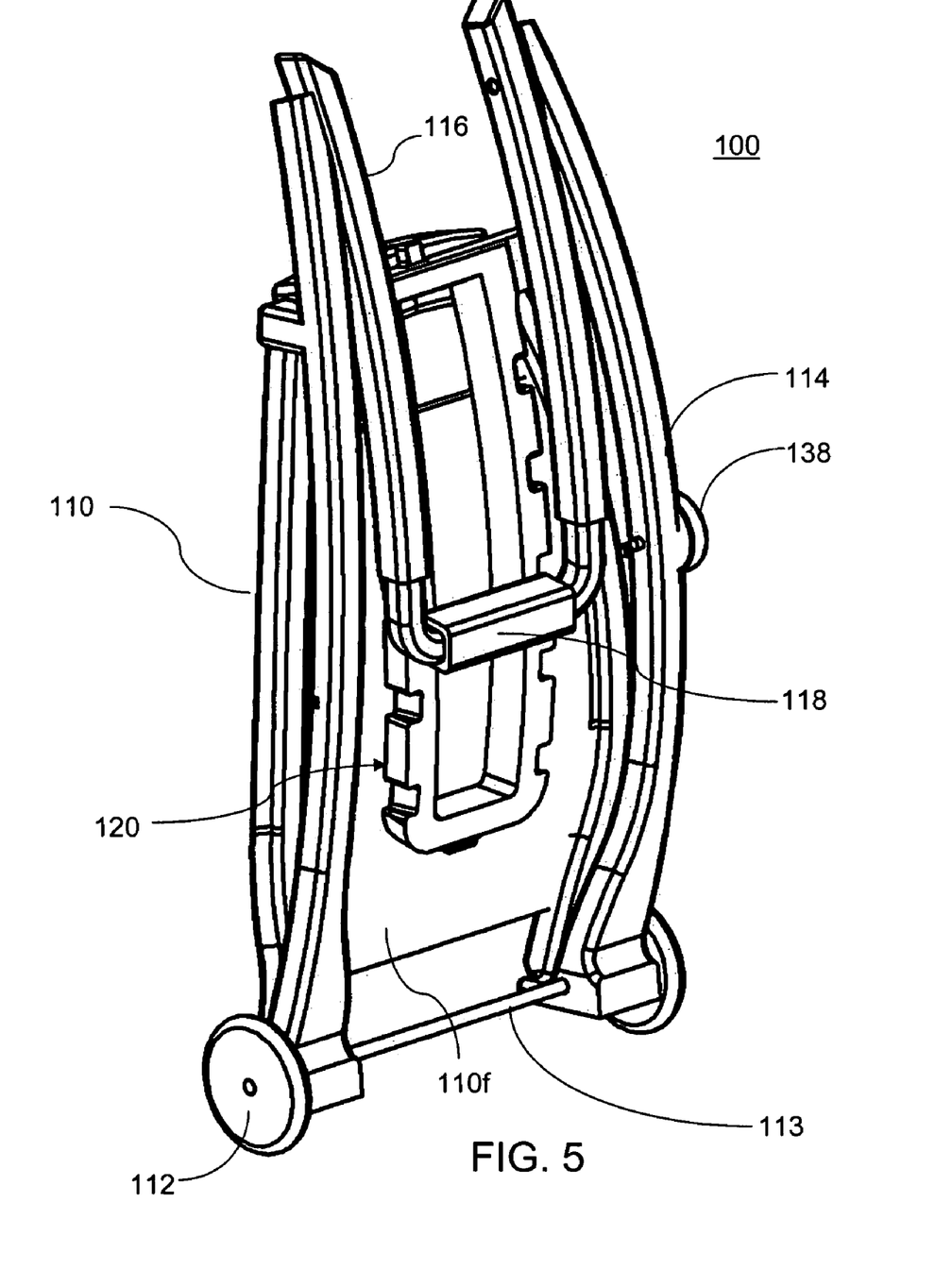
FIG. 5 is an isometric view of the cart of FIG. 1 in its collapsed storage configuration.
Figure 6:
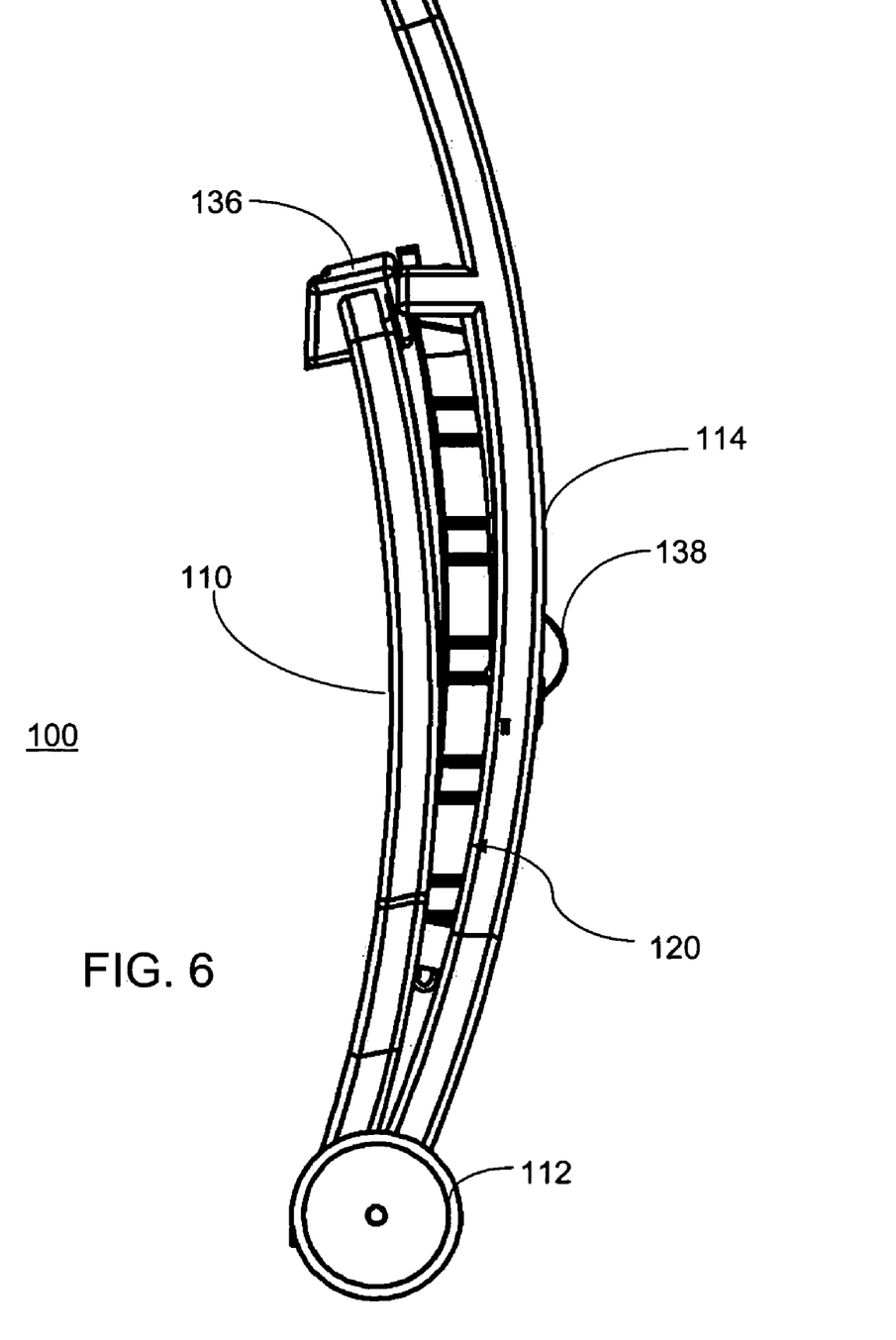
FIG. 6 is a side elevation view of the collapsed cart shown in FIG. 5.
Figure 7:
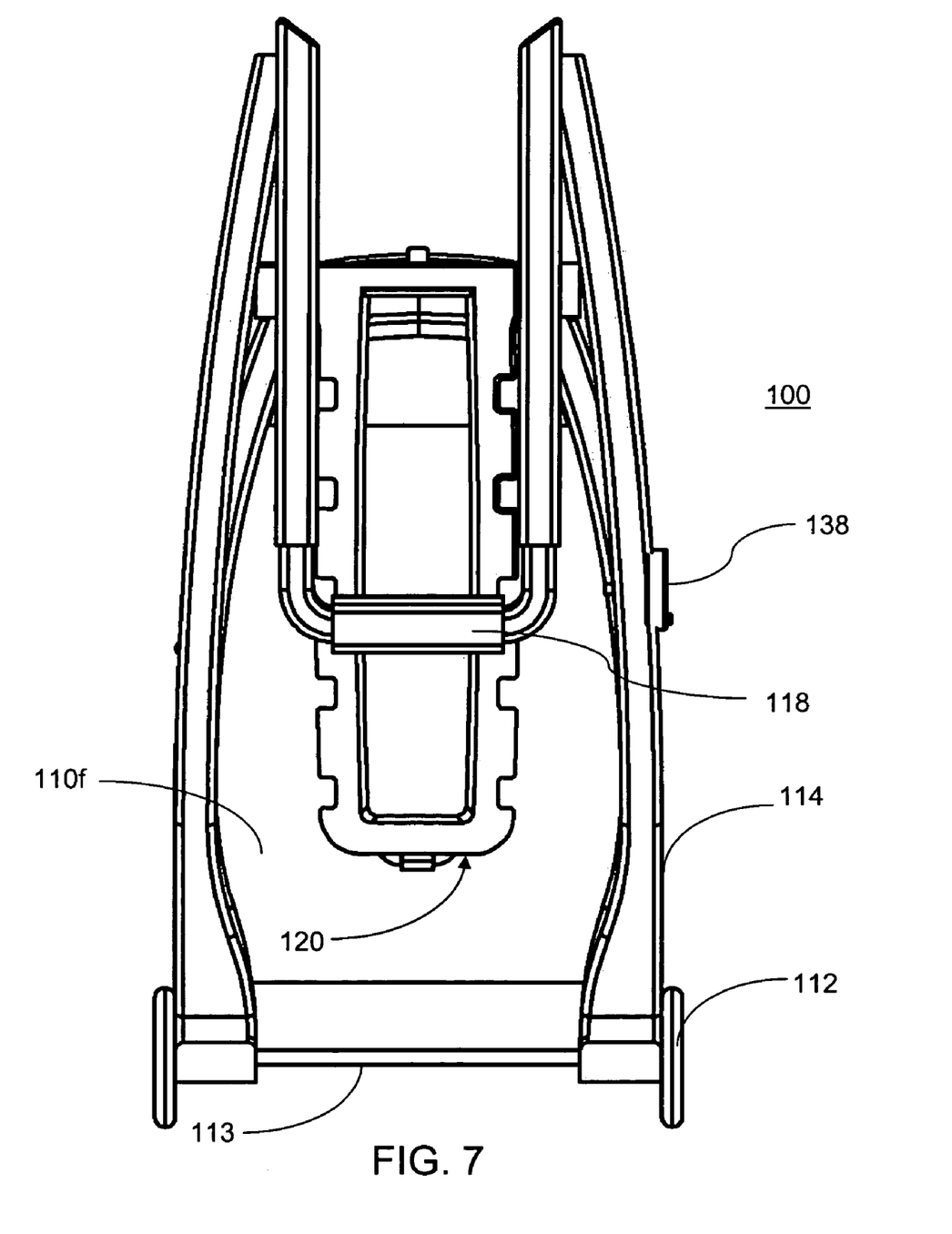
FIG. 7 is a front elevation view of the collapsed cart shown in FIG. 5.

The stretch cord 124 extends over the stowed bag handles to positively retain bags. Also, the stretch cord provides a degree of protection against accidental spills or quick theft of bags. The stretch cord 124 may also be used to restrain the folded members (base 110, rack 120 and frame portion 116) while in the collapsed position (FIGS. 5-7).

Although the example described above include an elastic or flexible retaining member to retain the bag handles, in other embodiments, a rigid retaining member may be placed over rack 120.

In some embodiments, a second retaining member 126 is attachable to the first frame portion 114, to prevent swinging of the bag, box or parcel. For example, the second retaining member 126 may be a retractable elastic cord attached at each end to the frame (A spring loaded reel 138 may be provided for retracting the cord 126). The retractable stretch cord 126 cinches up all hanging bags to prevent excess swing during transport. The stretch cord 126 also secures the folded structural base members in folded position of FIGS. 5-7, as the stretch cord restrains the upper members (frame portion 116, handle 118 and rack 120).

This design of the rack 120 and retaining members 124 and 126 can prevent injury to children or others standing near the cart 100. Additionally, because the bag/parcel handles are draped across top of the rack 120, each individual bag or parcel is positioned so as to be approximately centered along the longitudinal axis of the rack 120. This improves the balance of the cart 100, as compared to carts in which each bag/parcel is hung from one side or the other of the rack 120.

The cart 100 has a base 110 with a plurality of wheels 112. Preferably, the wheels 112 are rubberized to promote smooth passage over a variety of indoor and outdoor surfaces. The wheels 112 may be mounted directly to an axle 113, or the wheels may have optional bearings (not shown) for low friction rotation. Preferably, the base 110 has strong, lightweight floor support members 100m, which may be curved to accommodate slight, natural flexing under load. A pair of stabilizers 111 are provided to hold the first frame portion 114 at a predetermined angle with respect to the base 110, and prevent accidental collapse during use. Detents or latches may be used to secure the stabilizers 111 in place during use, while still allowing easy collapsing of the cart 100 when desired.

A floor 110f allows transport of bulky, heavier items (e.g. cases or 12-packs of beverages, boxes or the like). In some embodiments, the floor 110f is made from a high modulus structural mesh to prevent packages from dragging on a walking surface when being transported. In some embodiments, the floor 110f may be made of a high strength net or mesh, which may be made of ropes or high strength fibers (e.g., nylon ropes). Although the drawings show a single continuous floor support 110f, in other embodiments, the floor support may include a lattice or a plurality of transverse bars or slats that serve the same function. A continuous solid floor may alternatively be used, but may increase the total weight of the cart 100.

A retractable handle 118 can extend to the most comfortable height of the user. Preferably, a comfortable grip 118g is provided for low hand stresses during operation.

In some embodiments, the second frame portion 116 is curved so as to be concave towards a user standing behind the cart. Preferably, in these embodiments, the frame handle 118 has a curved frame portion 118c that is retractable within the second frame portion 116, so that extension of the frame handle advances the frame handle towards the user standing behind the cart. As the extension of the handle 118 increases, the curved member 118c automatically positions the grip 118g more towards the user (i.e., towards the rear of the cart 100), reducing the force necessary to tilt the cart forward.

In some embodiments, the first frame portion 114 is curved so as to be convex towards a user standing behind the cart 100, so that the first frame portion 114 and second frame portion 116 are convex in the same direction when the second portion is pivoted to a storage position (shown in FIGS. 5-7). An advantage of having the lower support members of the first frame portion 114 curved is to allow for extra hanging space. All structural members have ideal curves for functionality while providing a matching curved profile in the folded, stowed position.

In some embodiments, the base 110, the first frame portion 114 and second frame portion 116, and the rack 120 are all curved, and the base 110, the first and second frame portions 114, 116, and the rack 120 are all concave in the same direction when the first and second frame portions and the rack are pivoted to a storage position adjacent the base.

The first and second frame portions 114 and 116 are preferably made of a strong, lightweight material such as aluminum. Other materials may be used, such as plastic, steel, fiberglass, or a lightweight composite material, for example a carbon and resin system.

In some embodiments, the base 110 has a brake 136 at an end opposite the wheels 112. The brake 136 is shaped to provide a hand grip for carrying the cart 100 when the first and second frame portions 114 and 116 and the rack 120 are pivoted to a storage position adjacent the base.

The rubberized brake 136 keeps the cart 100 stationary in an open, upright position. The brake 136 may have a thin center section, which allows it to be used as a handle when transporting in the folded position.

FIGS. 5-7 show the cart 100 in the collapsed position. The second frame portion 116 pivots downward by about 180 degrees. The rack 120 pivots downward by about 90 degrees. The base 110 pivots upward by about 90 degrees. Thus, the four main sections 110, 114, 116, and 120 of the cart 100 are folded into a compact package. The second retaining means 126 can be extended about the collapsed cart 100 to keep the members 110, 114, 116 and 120 from pivoting outwardly during handling.

Additionally, some embodiments have an optional bag 140 (FIG. 8) positioned above the rack 120, in which case the stretch cord 124 may be used to stretch over items placed on top of the bag support member 120 in the bag 140 to secure products placed in the bag. Alternatively, if the bag 140 is provided, the bag 140 itself serves as a retaining means. The bag 140 can be stretched above the length of the rack 120 in the same manner as the stretch cord 124, preventing accidental spillage or quick theft. In a preferred embodiment, the bag 140 is made of a netted material such as nylon or the like, but other materials (e.g., tightly woven fabric) may be used.

Figure 8:
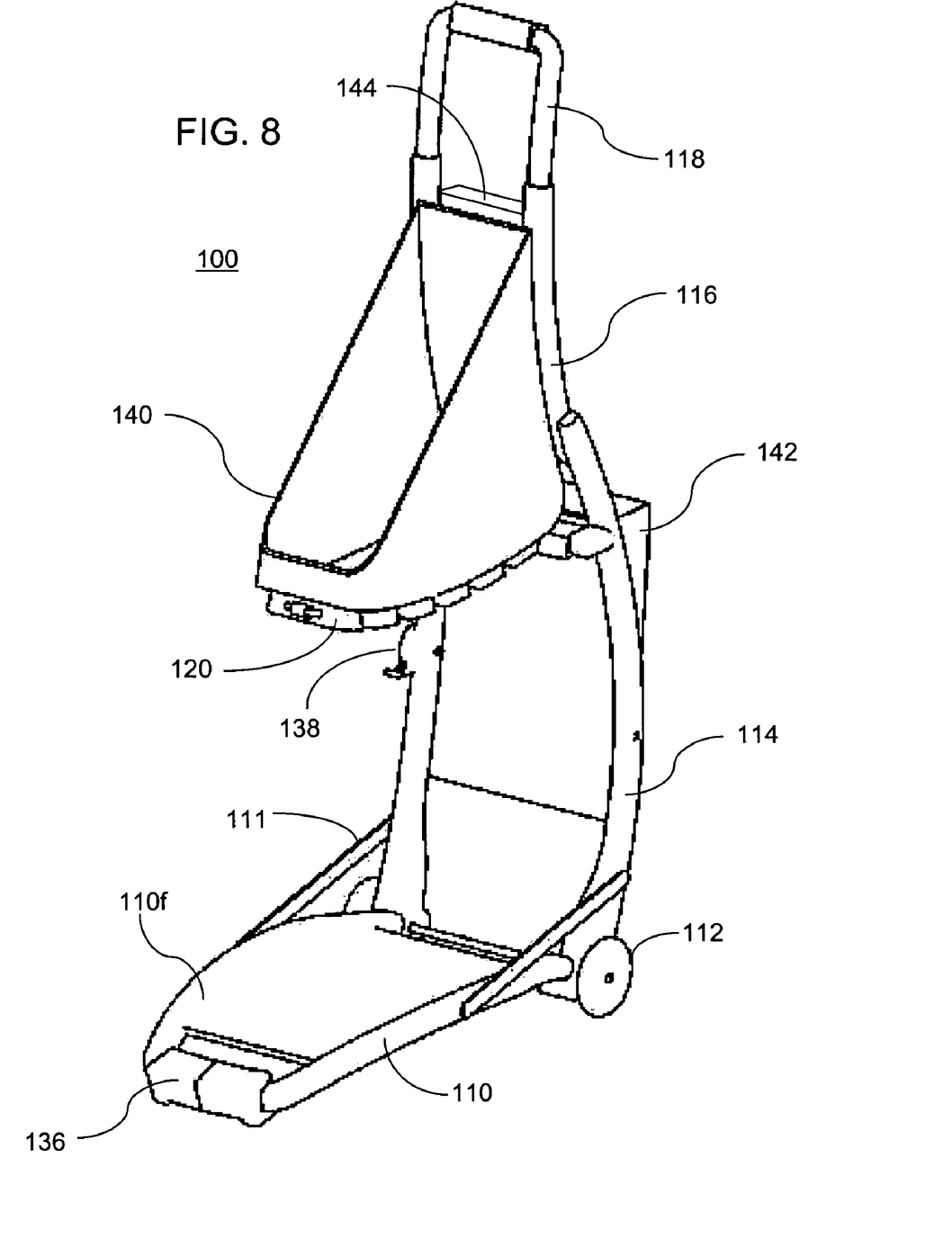
FIG. 8 is an isometric view of the cart of FIG. 1, with two tote-bags mounted thereon.

The bag 140 attaches on top of the bag support rack 120 to provide additional carrying capacity for final purchases or fragile items that may be damaged if impacted by another purchase. In some embodiments, the bag 140 may be attached to the rack and also attached to at least one of the second frame portion 116 and the handle 118. FIG. 8 shows an example of a bag 140 attached to the second frame portion 116. The top of the bag 140 may alternatively be attached to the handle 118 (not shown). This bag 140 is preferably removable and may be stowed for convenience when not in use. Although a preferred bag material is netted, a tightly weaved fabric or other material may also be used.

In some embodiments, an optional bag 142 may be attached to the first frame portion 114. Preferably, the bag 142 is a large netted storage bag, which may be used for transporting cumbersome purchases or personal items.

In some embodiments, an optional bag 144 may be attachable behind the second frame portion 116. Preferably, the bag 144 is an opaque zippered bag that can provide out-of-site storage of valuable personal items or small purchased goods.

Although the example of FIG. 8 includes all three of the above described bags 140, 142 and 144, other embodiments are contemplated having any combination of one or two of these three bags.

The cart 100 includes additional conventional pins and fasteners, for forming the pivotal connections. Although these pins and fasteners are not described in detail above, one of ordinary skill in the art can readily incorporate these items as appropriate.

Although the examples described above include bags as accessories, one of ordinary skill in the art can readily provide lugs, hooks or attachment points for other types of accessories, such as an umbrella, brief case, or the like.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A cart comprising:
   a base having a plurality of wheels;
   a first frame portion pivotally attached to the base;
   a second frame portion pivotally attached to the first frame portion; the second frame portion having a frame handle; and
   a rack pivotally attached to the first frame portion; the rack having a plurality of slots, indentations, or cut-outs arranged in pairs on opposite sides of the rack, each pair of slots, indentations or cut-outs capable of receiving a respective handle of a respective bag, box or parcel hanging from the rack;
   wherein the base, the first and second frame portions, and the rack are all curved, and the base, the first and second frame portions, and the rack are all concave in the same direction when the first and second frame portions and the rack are pivoted to a storage position adjacent the base.

2. The cart of claim 1, further comprising a retaining member attachable to the rack so as to overlie each respective handle of a bag, box or parcel, securing the bag, box or parcel when the retaining member is attached to the rack.

3. The cart of claim 2, wherein the retaining member is attached at opposite ends of the rack.

4. The cart of claim 2, wherein the rack has a projection on an end thereof, and the retaining member comprises a U-shaped elastic band having two ends attached to an end of the rack, the elastic band wrapped around the projection.

5. The cart of claim 2, further comprising a second retaining member attachable to the first frame portion, to prevent swinging of the bag, box or parcel.

6. The cart of claim 2, wherein the second retaining member is a retractable elastic cord.

7. The cart of claim 1, wherein the second frame portion is curved so as to be concave towards a user standing behind the cart.

8. The cart of claim 7, wherein the frame handle has a curved frame portion that is retractable within the second frame portion, so that extension of the frame handle advances the frame handle towards the user standing behind the cart.

9. The cart of claim 7, wherein the first frame portion is curved so as to be convex towards a user standing behind the cart, whereby the first and second frame portions are convex in the same direction when the second portion is pivoted to a storage position.

10. The cart of claim 1, wherein the base has a brake at an end opposite the wheels, the brake shaped to provide a hand grip for carrying the cart when the first and second frame portions and the rack are pivoted to a storage position adjacent the base.

11. The cart of claim 1, further comprising a bag positioned above the rack, the bag attached to the rack and attached to one of the second frame portion and the handle.

12. The cart of claim 1, further comprising a bag attached to the first frame portion.

13. A cart comprising:
   a base having a plurality of wheels;
   a first frame portion pivotally attached to the base;
   a second frame portion pivotally attached to the first frame portion; the second frame portion having a frame handle;
   a rack pivotally attached to the first frame portion; the rack having a plurality of slots, indentations, or cut-outs arranged in pairs on opposite sides of the rack, each pair of slots, indentations or cut-outs capable of receiving a respective handle of a respective bag, box or parcel hanging from the rack; and
   a retaining member attachable to the rack so as to overlie each respective handle of a bag, box or parcel, securing the bag, box or parcel when the retaining member is attached to the rack,
   wherein the second frame portion is curved so as to be concave towards a user standing behind the cart, and
   the base, the first and second frame portions, and the rack are all curved, and the base, the first and second frame portions, and the rack are all concave in the same direction when the first and second frame portions and the rack are pivoted to a storage position adjacent the base.

14. The cart of claim 13, wherein the frame handle has a curved frame portion that is retractable within the second frame portion, so that extension of the frame handle advances the frame handle towards the user standing behind the cart.

15. The cart of claim 13, wherein the first frame portion is curved so as to be convex towards a user standing behind the cart, whereby the first and second frame portions are convex in the same direction when the second portion is pivoted to a storage position.

16. The cart of claim 13, wherein the base has a brake at an end opposite the wheels, the brake shaped to provide a hand grip for carrying the cart when the first and second frame portions and the rack are pivoted to a storage position adjacent the base.

17. The cart of claim 13, further comprising a bag positioned above the rack, the bag attached to the rack and attached to one of the second frame portion and the handle.

18. The cart of claim 13, further comprising a bag attached to the first frame portion.

* * * * *